United States Patent
Dai et al.

(10) Patent No.: US 11,323,562 B2
(45) Date of Patent: May 3, 2022

(54) COMMUNICATION METHOD FOR PROCESSING CRANK CALL

(71) Applicant: BEIJING BAIDU NETCOM SCIENCE AND TECHNOLOGY CO., LTD., Beijing (CN)

(72) Inventors: Jun Dai, Beijing (CN); Guorui Huang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 164 days.

(21) Appl. No.: 16/855,118

(22) Filed: Apr. 22, 2020

(65) Prior Publication Data
US 2020/0344352 A1    Oct. 29, 2020

(30) Foreign Application Priority Data

Apr. 24, 2019   (CN) .......................... 201910335302.7

(51) Int. Cl.
| H04M 3/436 | (2006.01) |
| H04M 3/54 | (2006.01) |
| H04M 3/42 | (2006.01) |
| G10L 13/047 | (2013.01) |

(52) U.S. Cl.
CPC .......... H04M 3/436 (2013.01); G10L 13/047 (2013.01); H04M 3/42059 (2013.01); H04M 3/42102 (2013.01); H04M 3/42221 (2013.01); H04M 3/54 (2013.01)

(58) Field of Classification Search
CPC ..... G10L 13/047; H04M 3/2281; H04M 3/42; H04M 3/42059; H04M 3/42102; H04M 3/42221; H04M 3/436; H04M 3/54; H04M 3/543

USPC .......................... 379/210.02, 210.03, 211.02
See application file for complete search history.

(56) References Cited

U.S. PATENT DOCUMENTS

2018/0240473 A1* 8/2018 Baracaldo Angel .... G10L 15/26
2019/0174000 A1* 6/2019 Bharrat ............. H04M 3/42059

FOREIGN PATENT DOCUMENTS

| CN | 1525722 A | 9/2004 |
| CN | 104601782 A | 5/2015 |
| CN | 107018227 A | 8/2017 |
| CN | 109451186 A | 3/2019 |
| JP | H0839288 A | 12/1996 |
| JP | H08339288 A | 12/1996 |
| JP | H10285270 A | 10/1998 |

(Continued)

OTHER PUBLICATIONS

Office Action for Chinese Application No. 201910335302.7, dated Aug. 27, 2020, 21 pages.

(Continued)

*Primary Examiner* — Harry S Hong
(74) *Attorney, Agent, or Firm* — Fay Sharpe LLP

(57) ABSTRACT

The disclosure provides a communication method. The method includes: receiving a call request forwarded by an operator server, the call request being sent by a calling terminal to the operator server; generating a transferring instruction in response to the call request being a crank call; and sending the transferring instruction to the operator server, such that the operator server establishes a call connection between the calling terminal and a smart device based on the transferring instruction.

19 Claims, 7 Drawing Sheets

(56) References Cited

FOREIGN PATENT DOCUMENTS

| JP | 2001189798 A | 7/2001 |
|----|--------------|--------|
| JP | 2019047493 A | 3/2019 |
| KR | 20010045008 A | 6/2001 |
| KR | 20080032418 A | 4/2008 |
| KR | 20100063844 A | 6/2010 |

OTHER PUBLICATIONS

Office Action for Japanese Application No. 2020-077007, dated Jun. 1, 2021, 3 pages.
Office Action for Korean Application No. 10-2020-0048683, dated Mar. 30, 6 pages.

\* cited by examiner

COMMUNICATION METHOD FOR PROCESSING CRANK CALL

CROSS-REFERENCE TO RELATED APPLICATION

This application claims a priority to and benefits of Chinese Patent Application No. 201910335302.7, filed on Apr. 24, 2019, the entire content of which is incorporated herein by reference.

TECHNICAL FIELD

The present disclosure relates to the field of communication technologies, and more particularly, to a communication method, a terminal, an operator server, and a smart device.

BACKGROUND

With the development of Internet and Internet of Things, users may receive a large number of marketing calls (i.e., crank calls) every year. Certainly, crank calls may also include non-marketing calls that are set by the users to be blocked.

In the related art, a call may be intercepted if it is recognized as a crank call. The recognition is mainly based on a calling number.

SUMMARY

In a first aspect, embodiments of the disclosure provide a communication method. The method includes: receiving a call request forwarded by an operator server, the call request being sent by a calling terminal to the operator server. The method further includes: generating a transferring instruction in response to the call request being a crank call. The method further includes: sending the transferring instruction to the operator server, such that the operator server establishes a call connection between the calling terminal and a smart device based on the transferring instruction.

In a second aspect, embodiments of the disclosure provide a communication method. The method includes: receiving a call request sent by a calling terminal; and forwarding the call request to a called terminal. The method further includes: receiving a transferring instruction sent by the called terminal, the transferring instruction being generated under a case that the called terminal determines that the call request is a crank call. The method further includes: establishing a call connection between a smart device and the calling terminal based on the transferring instruction.

In a third aspect, embodiments of the disclosure provide a communication method. The method includes: in response to establishing a call connection with a calling terminal, communicating with a calling user corresponding to the calling terminal; and recording call information with the calling user, the call information including a conversation content with the calling user.

BRIEF DESCRIPTION OF THE DRAWINGS

The drawings are used to provide a further understanding of the embodiments of the disclosure, and constitute a part of the specification. The drawings are used to explain the disclosure together with the embodiments of the disclosure rather than to limit the disclosure. The above and additional features and advantages will become more apparent to those skilled in the art from the following descriptions on the example embodiments with reference to the accompanying drawings, in which.

Figure 1:
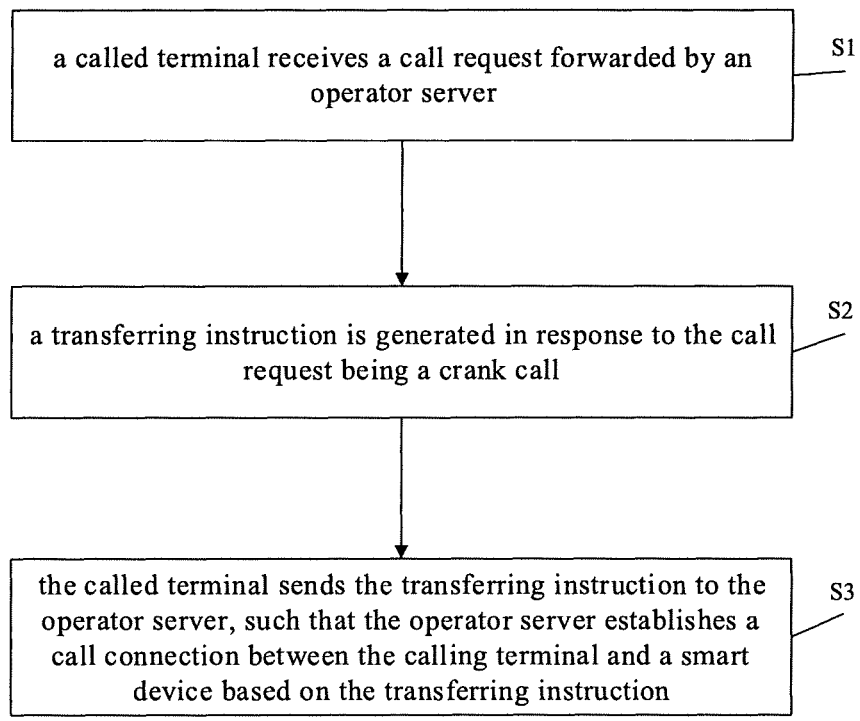
FIG. 1 is a schematic diagram of a communication method according to an embodiment of the disclosure.

REFERENCE NUMERALS first receiving module 1, generating module 2, first sending module 3, first determining module 4, second receiving module 21, forwarding module 22, establishing module 23, obtaining module 24, second sending module 25, communicating module 31, recording module 32, third receiving module 33, second determining module 34, selecting module 35, third sending module 36, and deleting module 37.

DETAILED DESCRIPTION

In order to enable those skilled in the art to better understand technical solutions of the disclosure, the communication method, the terminal, the operator server, and the smart device according to the disclosure will be described in detail below with reference to the drawings.

Example embodiments are described more fully hereinafter with reference to the drawings, but the example embodiments may be embodied in different forms and should not be construed as the limitation to the embodiments set forth herein. Rather, these embodiments are provided so that this disclosure will be thorough and complete, to enable those skilled in the art to fully understand the scope of this disclosure.

As used herein, the term "and/or" includes any and all combinations of one or more of the associated listed items.

The terms used herein are used to describe a particular embodiment and are not intended to limit the disclosure. As used herein, the singular forms "a" and "the" are intended to include the plural forms as well, unless the context clearly indicates otherwise. It is understood that when the terms "comprising" and/or "composed of" are used in this specification to indicate the presence of stated features, wholes, steps, operations, elements and/or components specified, it does not rule out the presence or addition of one or more other features, wholes, steps, operations, elements, components, and/or groups thereof.

Embodiments described herein may be described with reference to plan views and/or cross-sectional views with the aid of an ideal schematic diagram of the disclosure. Accordingly, the example illustrations may be modified according to manufacturing techniques and/or tolerances. Therefore, the embodiment is not limited to the embodiment shown in the drawings, but includes a modification of a configuration formed based on a manufacturing process. Therefore, the regions illustrated in the drawings have schematic attributes, and the shapes of the regions illustrated in the drawings indicate the specific shapes of the regions of the elements, but are not intended to be limiting.

Unless otherwise defined, all terms (including technical and scientific terms) used herein have the same meaning as commonly understood by those skilled in the art. It is understood that terms such as those defined in commonly used dictionaries should be interpreted to have meanings consistent with their meanings in the context of the related art and the disclosure, and will not be interpreted as having idealized or excessive formal meaning, unless explicitly defined herein.

FIG. 1 is a schematic diagram of a communication method according to an embodiment of the disclosure.

As illustrated in FIG. 1, the method includes the following.

At block S1, a called terminal receives a call request forwarded by an operator server. The call request is sent by a calling terminal to the operator server.

For example, a calling user, through the calling terminal, sends the call request for calling a called user to the operator server. After receiving the call request from the calling terminal, the operator server sends the call request to the called terminal.

At block S2, a transferring instruction is generated in response to the call request being a crank call.

At this operation, the called terminal determines whether the call request is the crank call. If the call request is the crank call, the called terminal generates the transferring instruction.

Crank calls include marketing calls and calls that are set by the called user to be in the blacklist of the called terminal in advance. That is, in the embodiments of the disclosure, the crank calls may be set by the called user based on his/her requirements, for example, the called user sets an unfamiliar number or a foreign number as a crank call as desired, thereby further improving the user experience and achieving the flexibility and diversity of calls.

The solution of determining whether the call request is the crank call may be referred to the related art, which is not described herein again.

At block S3, the called terminal sends the transferring instruction to the operator server, such that the operator server establishes a call connection between the calling terminal and a smart device based on the transferring instruction.

The transferring instruction is generated by the called terminal and sent to the operator server. After receiving the transferring instruction, the operator server establishes the call connection between the calling terminal and the smart device. That is, the operator server transfers the call to the smart device so that the calling user and the smart device may complete the call.

In the related art, when it is determined that the call request is the crank call, the called terminal directly refuses to establish the call connection with the calling terminal.

However, not all crank calls are intended to be blocked by the called user, for example, the called user has a need to buy a house, and the calling number is a phone number of a real estate seller. If the solution in the related art is adopted, the call will not be connected, which undoubtedly cause the disadvantage that the called user cannot obtain relevant information.

However, in the embodiments of the disclosure, a new communication method is proposed. When it is determined that the call request is the crank call, the called terminal generates the transferring instruction, and sends the transferring instruction to the operator server. The operator server may establish the call connection between the calling terminal and the smart device, thereby realizing the transferring the call through the call between the calling user and the smart device.

That is, through the technical solution according to the embodiment of the disclosure, the call between the smart device and the calling user may be realized.

In some embodiments, the smart device may be a conversation robot.

In some embodiments, the operation at block S2 may include the following. The called terminal generates a transferring instruction carrying the called number.

The operation at block S3 may include the following. The transferring instruction carrying the called number is sent to the operator server, such that the operator server determines the smart device based on the called number and a preset second mapping relation, and further establishes the call connection between the calling terminal and the smart device.

This embodiment is a refinement for the foregoing embodiment.

In this embodiment, there are a plurality of smart devices, and different called users may set or select smart devices based on their call requirements. The identifiers that distinguish the plurality of smart devices may be the called numbers. Certainly, the identifiers that distinguish the plurality of smart devices may also be terminal identifiers (such as an electronic serial number), or unique identifiers preset by the called users.

In detail, the called terminal writes the called number into the transferring instruction, and sends the transferring instruction carrying the called number to the operator server.

The second mapping relation is stored in the operator server in advance. The second mapping relation reflects the corresponding relation between different called numbers and different smart devices. That is, based on the second mapping relation and the called number, the smart device corresponding to the called number may be determined. Therefore, after receiving the transferring instruction carrying the called number, the operator server may determine the smart device corresponding to the called number based on the second mapping relation, and realize the call connection between the smart device and the calling terminal.

Based on the above analysis, it is known that the technical solution according to the embodiments of the disclosure may realize the flexibility and diversification in the communication process, and meet diverse needs of users.

Figure 2:
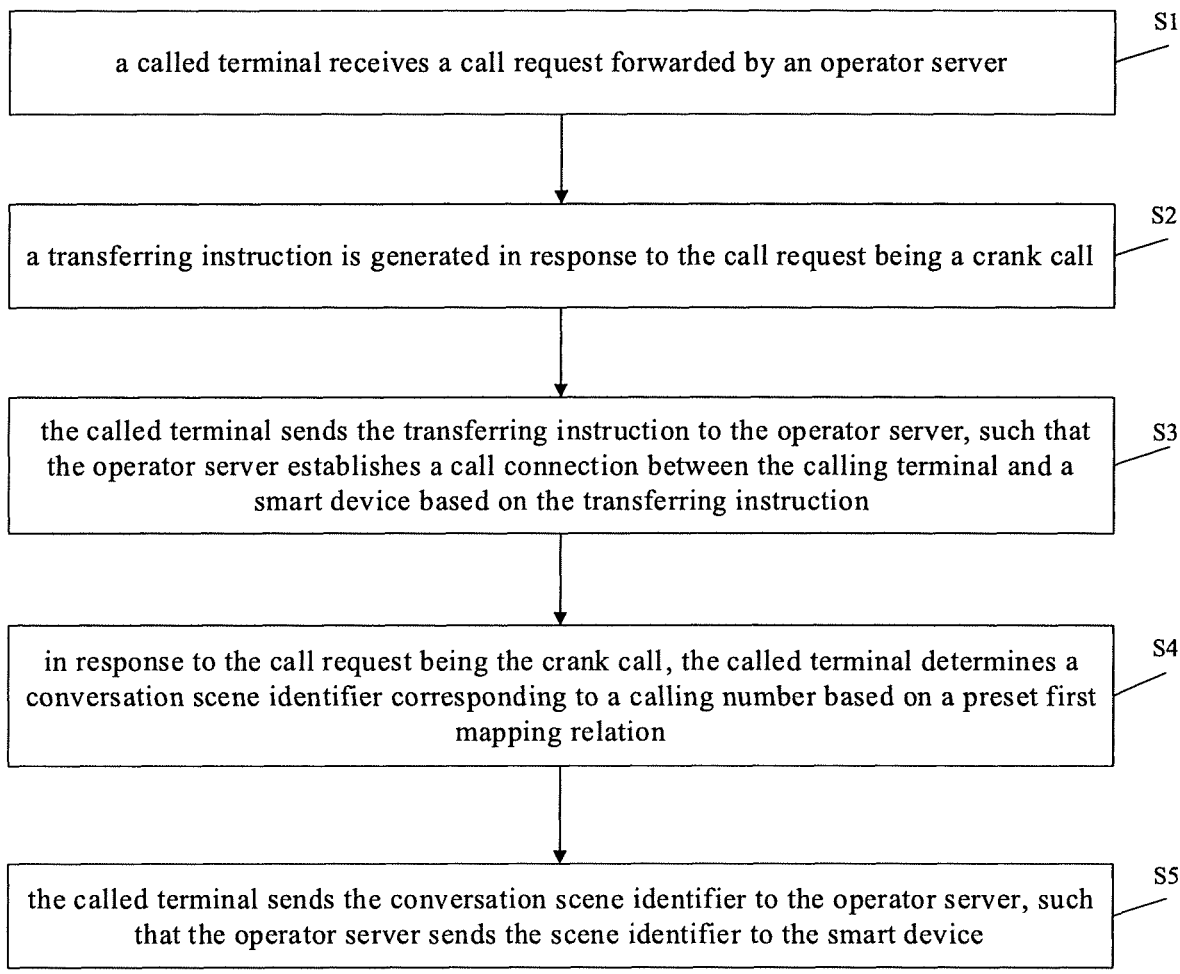
FIG. 2 is a schematic diagram of a communication method according to an embodiment of the disclosure.

As illustrated in FIG. 2, in some embodiments, after the operation at block S1, the method further includes the following.

At block S4, in response to the call request being the crank call, the called terminal determines a conversation scene identifier corresponding to a calling number based on a preset first mapping relation.

At block S5, the called terminal sends the conversation scene identifier to the operator server, such that the operator server sends the scene identifier to the smart device.

That is, a plurality of conversation scenes are stored in the smart device in advance, and each conversation scene corresponds to one conversation scene identifier. The called terminal stores the first mapping relation in advance. The first mapping relation reflects the corresponding relation between different calling numbers and different conversation scene identifiers. That is, the conversation scene identifier corresponding to the calling number may be determined based on the first mapping relation and the calling number, and a conversation scene corresponding to the calling number may be further determined.

In detail, if the calling number is a phone number of a real estate seller, the called terminal may determine the conversation scene identifier corresponding to the calling number based on the first mapping relation, and send the conversation scene identifier to the operator server. The operator server forwards the conversation scene identifier to the smart device. The smart device selects a conversation scene for real estate sales based on the conversation scene identifier, thereby realizing the call between the smart device and the calling user.

Based on the above analysis, it may be known that the technical solution according to the embodiments of the disclosure may realize different call scenes for different calling numbers, and further realize the flexibility and efficiency of calls.

It should be noted that there is no necessary sequence relation between the operation of generating the transferring instruction (i.e., at block S2) and the operation of determining the conversation scene identifier (i.e., block S3).

Figure 3:
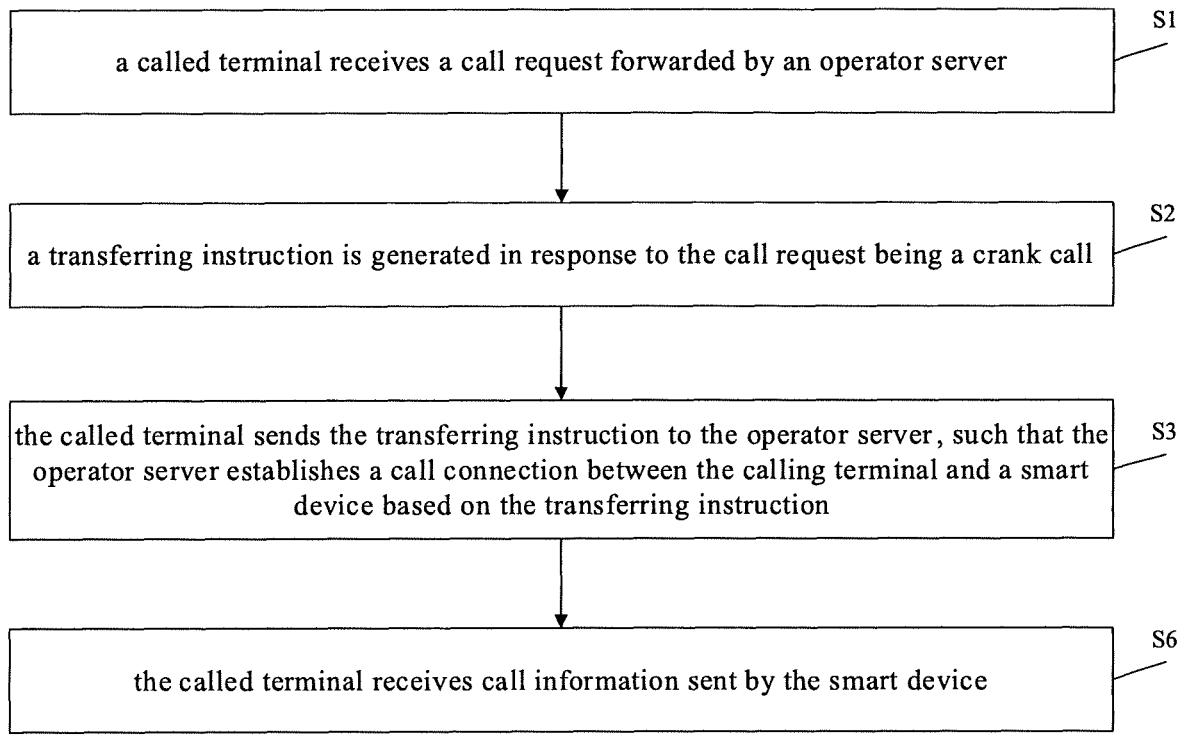
FIG. 3 is a schematic diagram of a communication method according to an embodiment of the disclosure.

As illustrated in FIG. 3, in some embodiments, after the operation at block S3, the method further includes the following.

At block S6, the called terminal receives call information sent by the smart device, in which the call information includes a conversation content between the smart device and a calling user corresponding to the calling terminal, and the conversation content is recorded by the smart device after the operator server establishes the call connection between the calling terminal and the smart device.

In the embodiments of the disclosure, after the operator server establishes the call connection between the smart device and the calling terminal, the smart device makes a call with the calling user corresponding to the calling terminal. The smart device records the conversation content with the calling user to obtain the call information, and send the call information to the called terminal.

The smart device sends the call information to the called terminal by means of emails and short messages.

In other words, through the technical solution of the embodiments of the disclosure, the called user may learn the content of the call by consulting the mails and the short messages, and obtain relevant contents concerned.

In some embodiments, the smart device may send the call information to the operator server. The operator server forwards the call information to the called terminal.

According to another aspect of the embodiments of the disclosure, the embodiments of the disclosure further provide a communication method applicable for an operator server.

Figure 4:
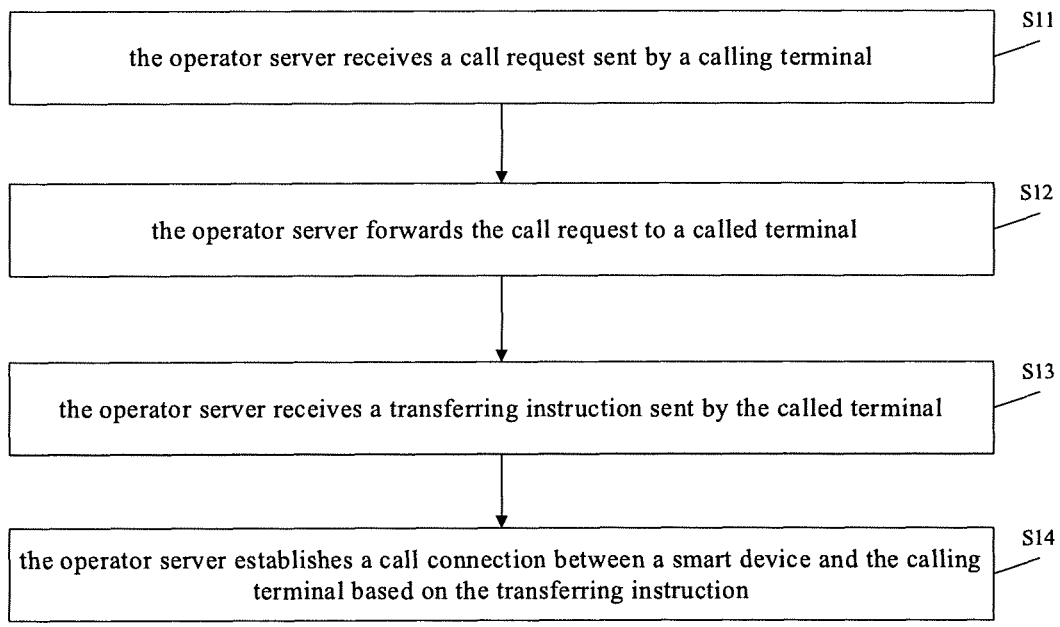
FIG. 4 is a schematic diagram of a communication method according to an embodiment of the disclosure.

FIG. 4 is a schematic diagram of a communication method according to an embodiment of the disclosure.

As illustrated in FIG. 4, the method further includes the following.

At block S11, the operator server receives a call request sent by a calling terminal.

At block S12, the operator server forwards the call request to a called terminal.

At block S13, the operator server receives a transferring instruction sent by the called terminal, in which the transferring instruction is generated under a case that the called terminal determines that the call request is a crank call.

At block S14, the operator server establishes a call connection between a smart device and the calling terminal based on the transferring instruction.

In some embodiments, after the operation at block S13, the method further includes the following.

At block S15, the operator server obtains a called number in the transferring instruction.

The operation at S14 includes the following.

At block S14-1, the operator server determines the smart device based on the called number and a preset second mapping relation.

At block S14-2, the operator server establishes the call connection between the smart device and the calling terminal.

Figure 5:
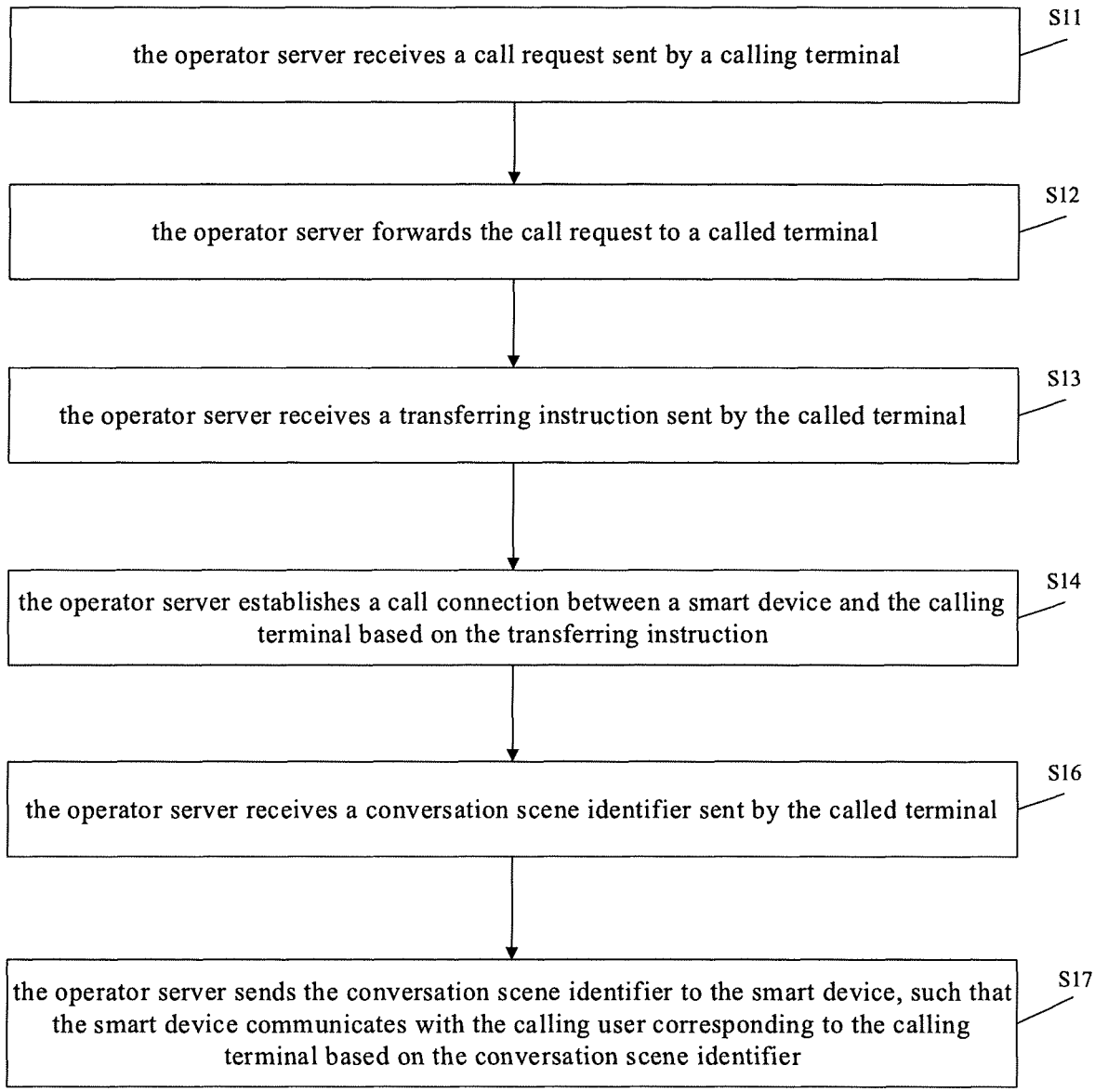
FIG. 5 is a schematic diagram of a communication method according to an embodiment of the disclosure.

As illustrated in FIG. 5, in some embodiments, after the operation at block S12, the method further includes the following.

At block S16, the operator server receives a conversation scene identifier sent by the called terminal, in which the conversation scene identifier is determined by the called terminal based on a calling number and a preset first mapping relation.

At block S17, the operator server sends the conversation scene identifier to the smart device, such that the smart device communicates with the calling user corresponding to the calling terminal based on the conversation scene identifier.

According to another aspect of the disclosed embodiment, the disclosed embodiment also provides a communication method applicable for a smart device.

Figure 6:
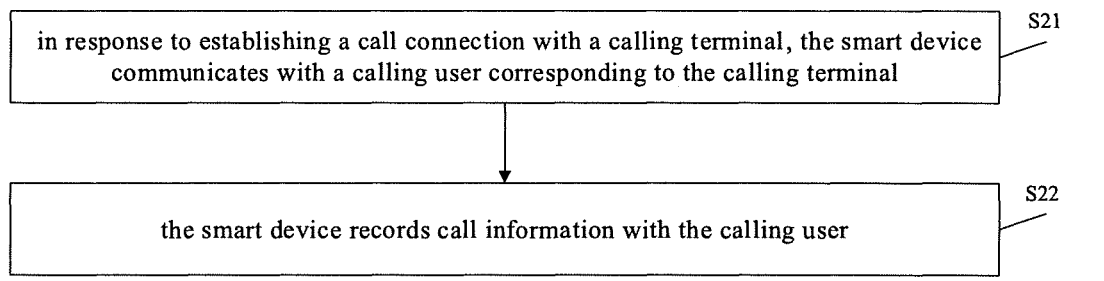
FIG. 6 is a schematic diagram of a communication method according to an embodiment of the disclosure.

FIG. 6 is a schematic diagram of a communication method according to an embodiment of the disclosure.

As illustrated in FIG. 6, the method further includes the following.

At block S21, in response to establishing a call connection with a calling terminal, the smart device communicates with a calling user corresponding to the calling terminal.

At block S22, the smart device records call information with the calling user, in which the call information includes a conversation content with the calling user.

Figure 7:
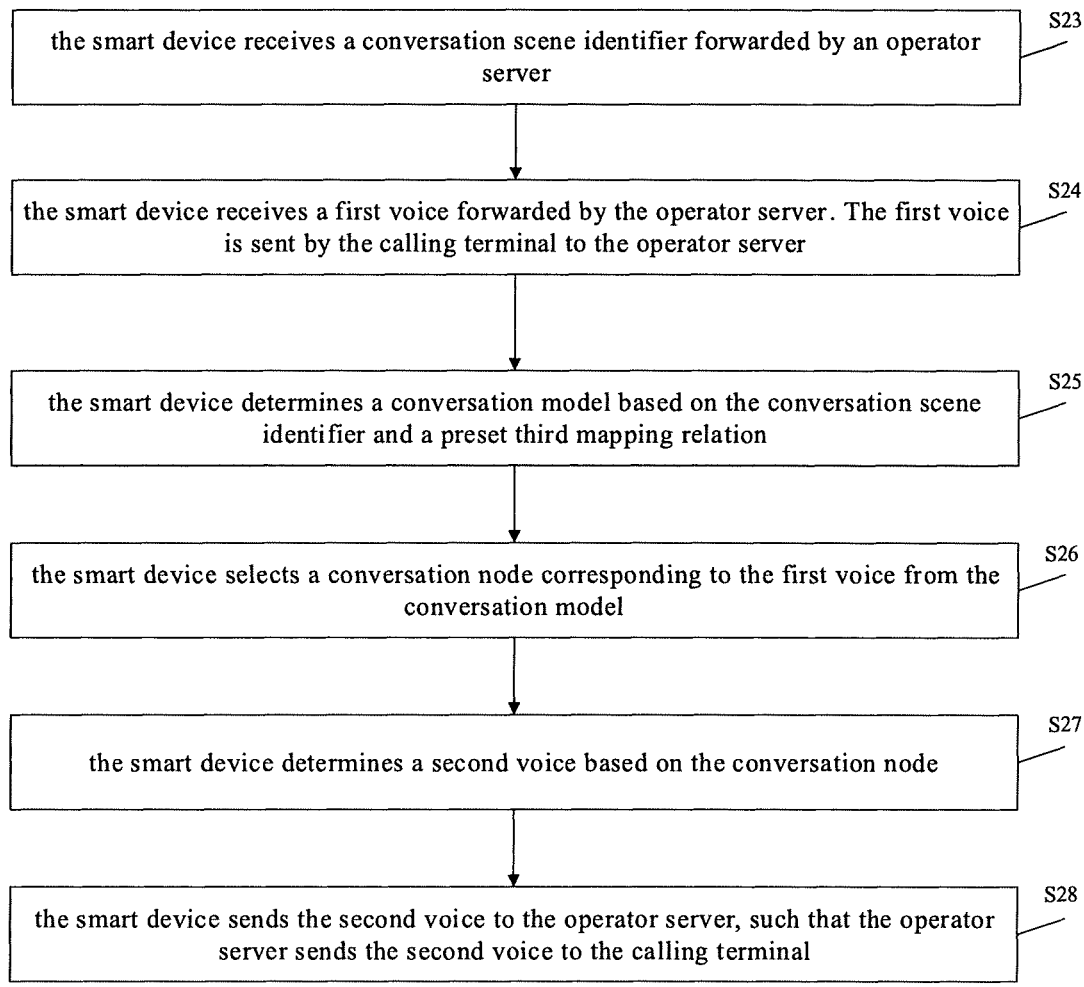
FIG. 7 is a schematic diagram of a communication method according to an embodiment of the disclosure.

As illustrated in FIG. 7, in some embodiments, after establishing the call connection with the calling terminal, the method further includes the following.

At block S23, the smart device receives a conversation scene identifier forwarded by an operator server, in which the conversation scene identifier is sent by a called terminal to the operator server, and the conversation scene identifier is determined by the called terminal based on a calling number and a preset first mapping relation.

At block S24, the smart device receives a first voice forwarded by the operator server. The first voice is sent by the calling terminal to the operator server.

At block S25, the smart device determines a conversation model based on the conversation scene identifier and a preset third mapping relation.

At block S26, the smart device selects a conversation node corresponding to the first voice from the conversation model.

At block S27, the smart device determines a second voice based on the conversation node.

At block S28, the smart device sends the second voice to the operator server, such that the operator server sends the second voice to the calling terminal.

In other words, the smart device may construct different conversation models based on different conversation scenes in advance. For example, a conversation model for real estate sales is constructed based on a conversation scene of real estate sales, and a conversation model for credit card sales is constructed based on a conversation scene of credit card sales, which is not limited herein again.

In the embodiments of the disclosure, the smart device stores the third mapping relation between different conversation models and conversation scene identifiers in advance. The third mapping relation reflects the correspondence between different conversation scene identifiers and different conversation models. That is, based on the third mapping relation and the conversation scene identifier, the conversation model corresponding to the conversation scene identifier may be determined.

In some embodiments, the operation at block S27 includes the following.

At block S27-1, the smart device selects a voice text corresponding to the conversation node from a preset database.

At block S27-2, the smart device performs format conversion on the voice text to obtain the second voice.

Figure 8:
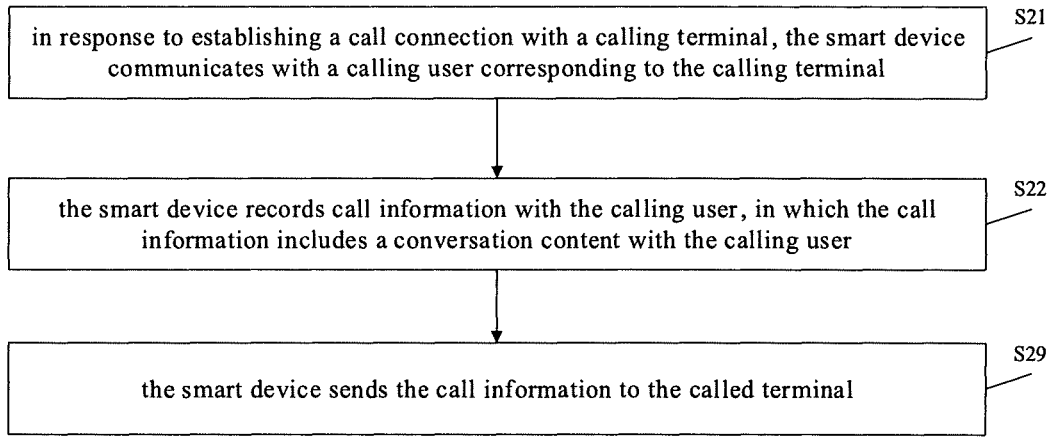
FIG. 8 is a schematic diagram of a communication method according to an embodiment of the disclosure.

As illustrated in FIG. 8, in some embodiments, after the operation at block S22, the method further includes the following.

At block S29, the smart device sends the call information to the called terminal.

In some embodiments, the smart device may also send the call information to the operator server, and then the operator server sends the call information to the called terminal.

In some embodiments, before the operation at block S29, the method further includes the following.

At block S29', a voice that cannot be parsed as intention is deleted from the call information.

The operation at block S29 includes the following. The call information from which the voice that cannot be parsed as intention is deleted, is sent to the called terminal.

Intention refers to the content containing substantive information such as needs, hopes, and desires. When a voice may be parsed to obtain the user's needs, hopes, or wishes, it means that the voice may be parsed as an intention.

For example, the call information includes the voice "hello" sent by the calling user, and the smart device analyzes "hello" but cannot determine the demand based on this voice. For the voice "50,000 CNY per square meter", sent by the calling user and included in the call information, the smart device may clearly determine the user's needs after analyzing the "50,000 CNY per square meter", that is, "how much does a square meter of a house cost?"

Certainly, in some embodiments, the called user may select the node of interest in the conversion model of the smart device. The smart device sets a slot based on the node (i.e., the node that the called user is interested in), obtains the related voice by filling the slot, and sends the call information of the related voice to the called terminal.

Figure 9:
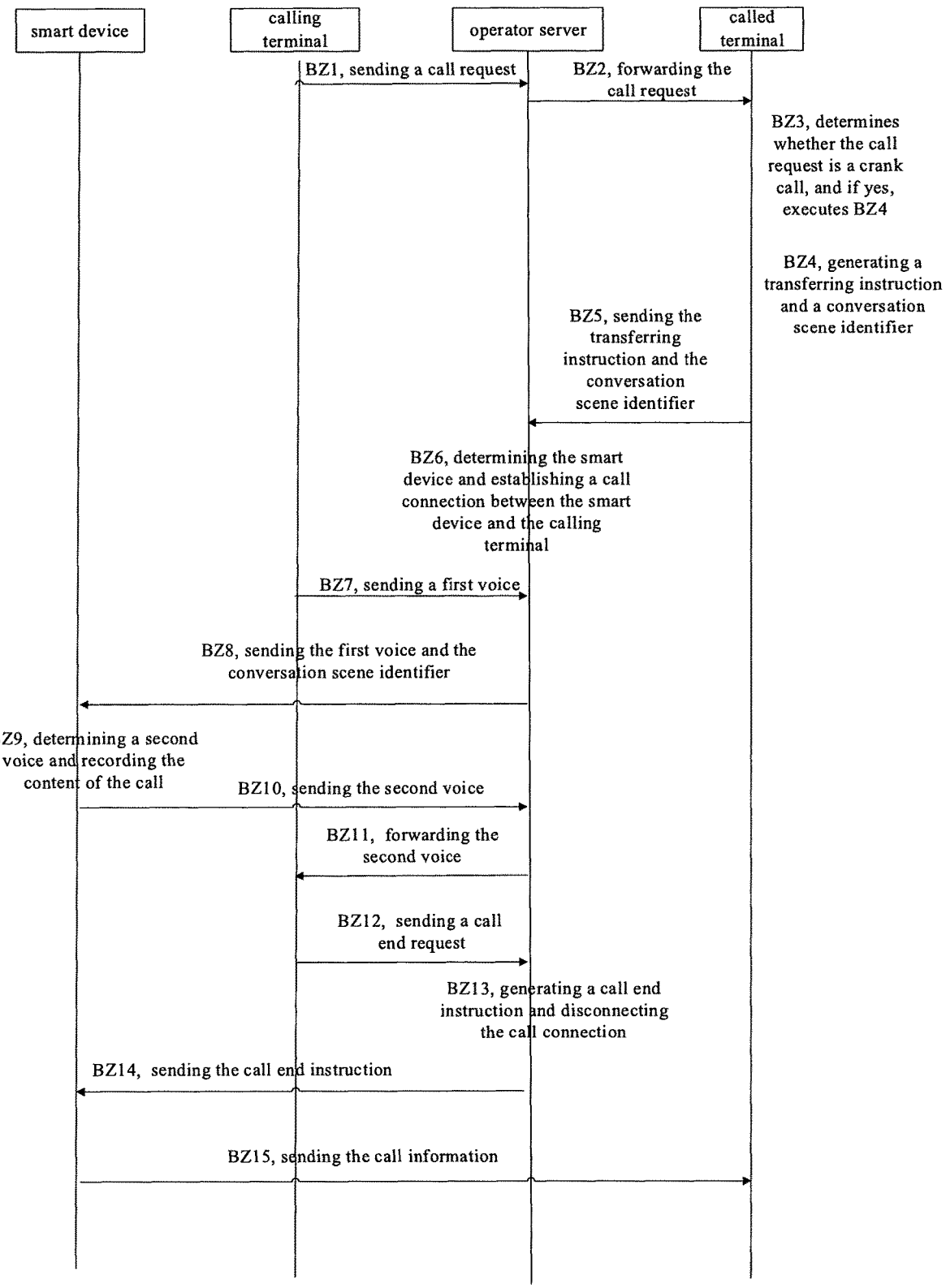
FIG. 9 is a schematic diagram of a signaling of a communication method according to an embodiment of the disclosure.

In order to understand the embodiments of the disclosure more thoroughly, the embodiments of the disclosure are described in detail with reference to FIG. 9. FIG. 9 is a schematic diagram of a signaling of a communication method according to an embodiment of the disclosure.

At block BZ1, a calling user, through a calling terminal, sends a call request for calling a called user to an operator server.

At block BZ2, the operator server forwards the call request to the called terminal.

At block BZ3, the called terminal determines whether the call request is a crank call. If yes, the operation at block BZ4 is executed, and if not, the called user determines whether to answer the call request.

At block BZ4, the called terminal generates a transferring instruction carrying the called number, and determines a conversation scene identifier corresponding to the calling number based on the first mapping relation.

At block BZ5, the called terminal sends the transferring instruction and the conversation scene identifier to the operator server.

At block BZ6, the operator server determines the smart device corresponding to the called number based on the second mapping relation, and establishes a call connection between the smart device and the calling terminal.

At block BZ7, the calling terminal sends a first voice sent by the calling user to the operator server.

At block BZ8, the operator server sends the first voice and the conversation scene identifier to the smart device.

At block BZ9, the smart device determines a conversation model based on the conversation scene identifier, determines a conversation node of the first voice in the conversation model, determines a second voice that responds to the first voice based on the conversation node, and records the content of the call.

At block BZ10, the smart device sends the second voice to the operator server.

At block BZ11, the operator server forwards the second voice to the calling terminal.

At block BZ12, the calling user sends a call end request to the operator server through the calling terminal.

At block BZ13, the operator server generates a call end instruction based on the call end request, and disconnects the call connection between the smart device and the calling terminal.

At block BZ14, the operator server sends the call end instruction to the smart device.

At block BZ15, the smart device sends the call information (including the content of the call between the smart device and the calling user) to the called terminal.

According to another aspect of the embodiments of the disclosure, the embodiments of the disclosure further provide a terminal.

Figure 10:
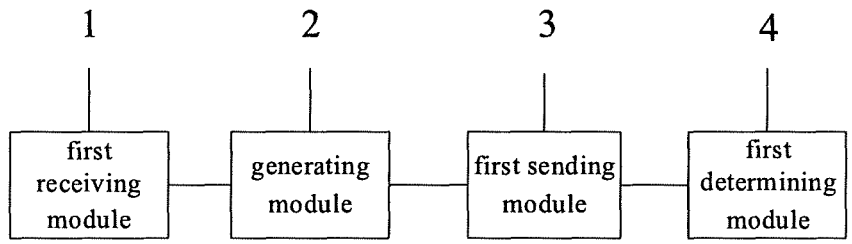
FIG. 10 is a schematic diagram of a terminal according to an embodiment of the disclosure.

FIG. 10 is a schematic diagram of a terminal according to an embodiment of the disclosure.

As illustrated in FIG. 10, the terminal includes: a first receiving module 1, a generating module 2, and a first sending module 3.

The first receiving module 1 is configured to receive a call request forwarded by an operator server. The call request is sent by a calling terminal to the operator server.

The generating module 2 is configured to generate a transferring instruction in response to the call request being a crank call.

The first sending module 3 is configured to send the transferring instruction to the operator server, such that the operator server establishes a call connection between the calling terminal and a smart device based on the transferring instruction.

In some embodiments, the terminal further includes: a first determining module 4, configured to, in response to the call request being the crank call, determine a conversation scene identifier corresponding to a calling number based on a preset first mapping relation.

The first sending module 3 is further configured to send the conversation scene identifier to the operator server, such that the operator server sends the conversation scene identifier to the smart device.

The first receiving module 1 is further configured to receive call information sent by the smart device, in which the call information includes a conversation content between the smart device and a calling user corresponding to the calling terminal, and the conversation content is recorded by the smart device after the operator server establishes the call connection between the calling terminal and the smart device.

According to another aspect of the embodiments of the disclosure, the embodiments of the disclosure further provide an operator server.

Figure 11:
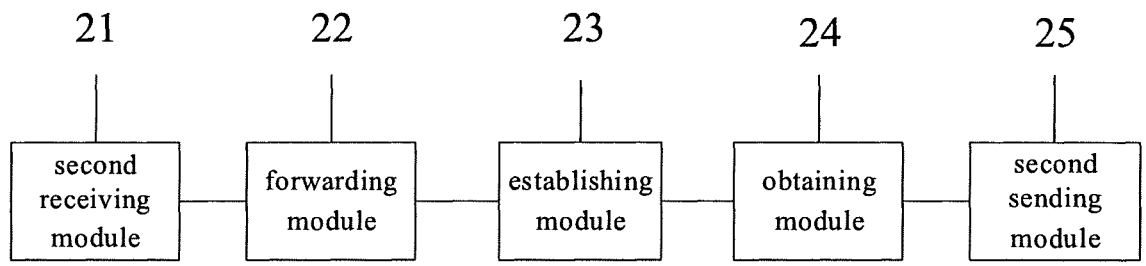
FIG. 11 is a schematic diagram of an operator server according to an embodiment of the disclosure.

FIG. 11 is a schematic diagram of an operator server according to an embodiment of the disclosure.

As illustrated in FIG. 11, the operator server includes: a second receiving module 21, a forwarding module 22, and an establishing module 23.

The second receiving module 21 is configured to receive a call request sent by a calling terminal.

The forwarding module 22 is configured to forward the call request to a called terminal.

The second receiving module 21 is further configured to receive a transferring instruction sent by the called terminal, in which the transferring instruction is generated under a case that the called terminal determines that the call request is a crank call.

The establishing module 23 is configured to establish a call connection between a smart device and the calling terminal based on the transferring instruction.

In some embodiments, the operator server further includes: an obtaining module 24, configured to obtain a called number in the transferring instruction.

The establishing module 23 is further configured to determine the smart device based on the called number and a preset second mapping relation, and establish the call connection between the smart device and the calling terminal.

The second receiving module 21 is further configured to receive a conversation scene identifier sent by the called terminal, the conversation scene identifier being determined by the called terminal based on a calling number and a preset first mapping relation.

In some embodiments, the operator server further includes: a second sending module 25 configured to send the conversation scene identifier to the smart device, such that the smart device communicates with the calling user corresponding to the calling terminal based on the conversation scene identifier.

According to another aspect of the embodiments of the disclosure, the embodiments of the disclosure also provide a smart device.

Figure 12:
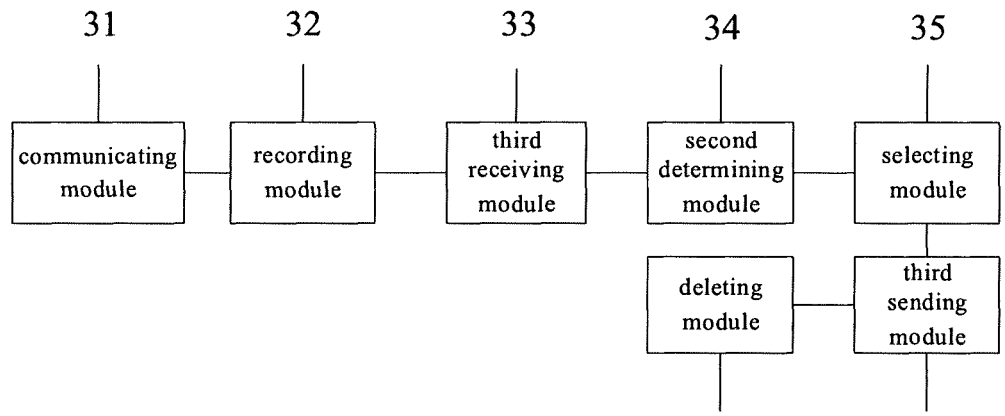
FIG. 12 is a schematic diagram of a smart device according to an embodiment of the disclosure.

FIG. 12 is a schematic diagram of a smart device according to an embodiment of the disclosure.

As illustrated in FIG. 12, the smart device includes: a communicating module 31, and a recording module 32.

The communicating module 31 is configured to, in response to establishing a call connection with a calling terminal, communicate with a calling user corresponding to the calling terminal.

The recording module 32 is configured to record call information with the calling user, in which the call information includes a conversation content with the calling user.

In some embodiments, the smart device further includes: a third receiving module 33, a second determining module 34, a selecting module 35, and a third sending module 36.

The third receiving module 33 is configured to receive a conversation scene identifier forwarded by an operator server, the conversation scene identifier being sent by a called terminal to the operator server, the conversation scene identifier being determined by the called terminal based on a calling number and a preset first mapping relation, and further configured to receive a first voice forwarded by the operator server, the first voice being sent by the calling terminal to the operator server.

The second determining module 34 is configured to determine a conversation model based on the conversation scene identifier and a preset third mapping relation.

The selecting module 35 is configured to select a conversation node corresponding to the first voice from the conversation model.

The second determining module 34 is further configured to determine a second voice based on the conversation node.

The third sending module 36 is configured to send the second voice to the operator server, such that the operator server sends the second voice to the calling terminal, and send the call information to the called terminal.

In some embodiments, the smart device further includes: a deleting module 37, configured to delete a voice that cannot be parsed as intention from the call information.

The third receiving module 36 is configured to send the call information from which the voice that cannot be parsed as intention is deleted, to the called terminal.

Those skilled in the art may understand that all or some operations, systems, and functional modules/units in the devices disclosed above may be implemented as software, firmware, hardware, and appropriate combinations thereof. In a hardware implementation, the division on functional modules/units mentioned in the above description does not necessarily correspond to the division of physical components. For example, one physical component may have multiple functions, or one function or operation may be executed cooperatively by several physical components. Some or all physical components may be implemented as software executed by a processor, such as a central processing unit, a digital signal processor, and a microprocessor, or implemented as hardware, or implemented as an integrated circuit, such as a dedicated integrated circuit. Such software may be distributed on a computer-readable medium, which may include a computer storage medium (or a non-transitory medium) and a communication medium (or a transitory medium). As is known to those skilled in the art, the term "computer storage media" may include volatile and non-volatile, removable and non-removable media implemented in any method or technology used to store information such as computer-readable instructions, data structures, program modules or other data. Computer storage media includes, but are not limited to, RAM (a random access memory), ROM (a read only memory), EEPROM (an electrically erasable programmable read only memory), flash memory or other memory technologies, CD-ROM (a portable compact disk read-only memory), digital versatile disk (DVD) or other optical disk storage, magnetic cartridges, magnetic tape, disk storage or other magnetic storage devices, or any other medium used to store desired information and can be accessed by a computer. In addition, it is well known to those skilled in the art that a communication medium typically contains computer-readable instructions, data structures, program modules, or other data in a modulated data signal such as a carrier wave or other transmission mechanism, and may include any information delivery medium.

Example embodiments have been disclosed herein, and although specific terminologies are employed, they are used only and should only be interpreted as a general illustrative meaning, and not for limiting purposes. In some instances, it will be apparent to those skilled in the art that features, characteristics and/or elements described in combination with a particular embodiment may be used alone, or in combination with additional features, characteristics and/or elements described in other embodiments. Therefore, it is understood by those skilled in the art that various changes in form and details may be made without departing from the scope of the disclosure as set forth in the appended claims.

What is claimed is:

1. A communication method, comprising:
receiving, by a called terminal, a call request forwarded by an operator server, the call request being sent by a calling terminal to the operator server;
generating, by the called terminal, a transferring instruction in response to the call request being a crank call; and
sending, by the called terminal, the transferring instruction to the operator server, such that the operator server establishes a call connection between the calling terminal and a smart device based on the transferring instruction, in which the smart device comprises a conversation robot set by the called terminal.

2. The method of claim 1, further comprising:
in response to the call request being the crank call, determining, by the called terminal, a conversation scene identifier corresponding to a calling number of the calling terminal based on a preset first mapping relation; and
sending, by the called terminal, the conversation scene identifier to the operator server, such that the operator server sends the conversation scene identifier to the smart device.

3. The method of claim 1, further comprising:
in response to the call request being the crank call, determining, by the called terminal, a conversation scene identifier corresponding to a calling number of the calling terminal based on a preset first mapping relation;
wherein, sending, by the called terminal, the transferring instruction to the operator server comprises: sending, by the called terminal, the transferring instruction and the conversation scene identifier to the operator server.

4. The method of claim 1, wherein,
generating, by the called terminal, the transferring instruction comprises: generating, by the called terminal, the transferring instruction carrying a called number of the called terminal; and
sending, by the called terminal, the transferring instruction to the operator server comprises: sending, by the called terminal, the transferring instruction carrying the called number to the operator server, such that the operator server determines the smart device based on the called number and a preset second mapping relation, and further establishes the call connection between the calling terminal and the smart device.

5. The method of claim 1, further comprising:
receiving, by the called terminal, call information sent by the smart device, wherein the call information comprises a conversation content between the smart device and a calling user corresponding to the calling terminal, and the conversation content is recorded by the smart device after the operator server establishes the call connection between the calling terminal and the smart device.

6. The method of claim 1, further comprising:
receiving, by the called terminal, call information forwarded by the operator server, wherein the call information comprises a conversation content between the smart device and a calling user corresponding to the calling terminal, and the conversation content is recorded by the smart device after the operator server establishes the call connection between the calling terminal and the smart device, and sent by the smart device to the operator server.

7. A communication method, comprising:
receiving, by an operator server, a call request sent by a calling terminal;
forwarding, by the operator server, the call request to a called terminal;
receiving, by the operator server, a transferring instruction sent by the called terminal in response to the call request, the transferring instruction being generated under a case that the called terminal determines that the call request is a crank call; and
establishing, by the operator server, a call connection between a smart device and the calling terminal based on the transferring instruction, in which the smart device comprises a conversation robot set by the called terminal.

8. The method of claim 7, further comprising:
obtaining, by the operator server, a called number in the transferring instruction; and
wherein establishing, by the operator server, the call connection between the smart device and the calling terminal based on the transferring instruction, comprises:
determining, by the operator server, the smart device based on the called number and a preset second mapping relation; and
establishing, by the operator server, the call connection between the smart device and the calling terminal.

9. The method of claim 7, further comprising:
receiving, by the operator server, a conversation scene identifier sent by the called terminal, the conversation scene identifier being determined by the called terminal based on a calling number of the calling terminal and a preset first mapping relation; and
sending, by the operator server, the conversation scene identifier to the smart device, such that the smart device communicates with the calling user corresponding to the calling terminal based on the conversation scene identifier.

10. The method of claim 7, further comprising:
receiving, by the operator server, call information sent by the smart device, wherein the call information comprises a conversation content between the smart device and a calling user corresponding to the calling terminal, and the conversation content is recorded by the smart device after the operator server establishes the call connection between the calling terminal and the smart device.

11. The method of claim 10, further comprising:
sending, by the operator server, the call information to the called terminal.

12. The method of claim 7, further comprising:
receiving, by the operator server, a call end request from the calling terminal; and disconnecting, by the operator server, the call connection between the smart device and the calling terminal.

13. The method of claim 12, further comprising:
generating, by the operator server, a call end instruction based on the call end request; and
sending, by the operator server, the call end instruction to the smart device.

14. A communication method, comprising:
in response to establishing a call connection with a calling terminal, communicating with a calling user corresponding to the calling terminal, by a smart device, in which the smart device comprises a conversation robot set by a called terminal;
recording, by the smart device, call information with the calling user, the call information comprising a conversation content with the calling user;
receiving, by the smart device, a conversation scene identifier forwarded by an operator server, the conversation scene identifier being sent by the called terminal to the operator server, the conversation scene identifier being determined by the called terminal based on a calling number of the calling terminal and a preset first mapping relation;
receiving, by the smart device, a first voice forwarded by the operator server, the first voice being sent by the calling terminal to the operator server;
determining, by the smart device, a conversation model based on the conversation scene identifier and a preset third mapping relation;
selecting, by the smart device, a conversation node corresponding to the first voice from the conversation model;
determining, by the smart device, a second voice based on the conversation node; and
sending, by the smart device, the second voice to the operator server, such that the operator server sends the second voice to the calling terminal.

15. The method of claim 14, wherein determining the second voice based on the conversation node comprises:
selecting, by the smart device, a voice text corresponding to the conversation node from a preset database; and
performing, by the smart device, format conversion on the voice text to obtain the second voice.

16. The method of claim 14, further comprising:
sending, by the smart device, the call information to the called terminal.

17. The method of claim 14, further comprising:
deleting, by the smart device, the first voice that cannot be parsed as intention from the call information.

18. The method of claim 14, further comprising:
sending, by the smart device, the conversation scene identifier to the operator server.

19. The method of claim 16, wherein sending the call information to the called terminal, comprises:
sending, by the smart device, the call information to the called terminal in response to receiving a call end instruction from the operator server.

* * * * *